United States Patent
Kim et al.

(10) Patent No.: US 8,081,712 B2
(45) Date of Patent: Dec. 20, 2011

(54) METHOD AND APPARATUS FOR MAPPING OF ABSOLUTE POWER GRANT VALUES IN WIRELESS COMMUNICATIONS

(75) Inventors: In H. Kim, Norristown, PA (US); Paul Marinier, Brossard (CA); Eldad M. Zeira, Huntington, NY (US); Christopher R. Cave, Verdun (CA)

(73) Assignee: Interdigital Technology Corporation, Wilmington, DE (US)

( * ) Notice: Subject to any disclaimer, the term of this patent is extended or adjusted under 35 U.S.C. 154(b) by 925 days.

(21) Appl. No.: 12/024,991

(22) Filed: Feb. 1, 2008

(65) Prior Publication Data

US 2008/0187070 A1  Aug. 7, 2008

Related U.S. Application Data

(60) Provisional application No. 60/887,856, filed on Feb. 2, 2007.

(51) Int. Cl.
    *H04K 1/02* (2006.01)
(52) U.S. Cl. .................................................. 375/297
(58) Field of Classification Search .......... 375/295–297; 455/127.1–127.5
    See application file for complete search history.

(56) References Cited

U.S. PATENT DOCUMENTS

| | | | |
|---|---|---|---|
| 6,115,587 A | 9/2000 | Kim | |
| 7,068,898 B2 | 6/2006 | Buretea et al. | |
| 7,068,985 B2 * | 6/2006 | Quilisch et al. | 455/127.2 |
| 2006/0252450 A1 | 11/2006 | Wigard et al. | |
| 2006/0268773 A1 | 11/2006 | Ranta-Aho et al. | |
| 2007/0117570 A1 | 5/2007 | Noh et al. | |
| 2008/0268799 A1 * | 10/2008 | McCune et al. | 455/127.2 |

FOREIGN PATENT DOCUMENTS

| | | |
|---|---|---|
| EP | 1 758 318 | 2/2007 |
| KR | 2004-0031928 A | 4/2004 |
| RU | 2134021 C1 | 7/1999 |
| RU | 2258309 C2 | 8/2005 |
| WO | WO 01/67621 A2 | 9/2001 |
| WO | WO 2005/020457 A1 | 3/2005 |
| WO | WO 2005/020475 A1 | 3/2005 |

OTHER PUBLICATIONS

3rd Generation Partnership Project; Technical Specification Group Radio Access Network; Multiplexing and channel coding (FDD) (Release 7); 3GPP TS 25.212 V7.3.0 (Dec. 2006).

3rd Generation Partnership Project; Technical Specification Group Radio Access Network; Multiplexing and channel coding (FDD) (Release 7); 3GPP TS 25.212 V7.7.0 (Nov. 2007).

3rd Generation Partnership Project; Technical Specification Group Radio Access Network; Multiplexing and channel coding (FDD) (Release 8); 3GPP TS 25.212 V8.0.0 (Nov. 2007).

(Continued)

*Primary Examiner* — Kevin Kim
(74) *Attorney, Agent, or Firm* — Condo Roccia LLP

(57) ABSTRACT

A method and apparatus for adjusting power grants in wireless communications. Multiple power grant tables are stored and one or more tables are designated during communication.

66 Claims, 2 Drawing Sheets

OTHER PUBLICATIONS

3$^{rd}$ Generation Partnership Project; Technical Specification Group Radio Access Network; Radio Resource Control (RRC); Protocol Specification (Release 7) 3GPP TS 25.331 V7.3.0 (Dec. 2006).

3$^{rd}$ Generation Partnership Project; Technical Specification Group Radio Access Network; Radio Resource Control (RRC); Protocol Specification (Release 7) 3GPP TS 25.331 V7.7.0 (Dec. 2007).

3$^{rd}$ Generation Partnership Project; Technical Specification Group Radio Access Network; Radio Resource Control (RRC); Protocol Specification (Release 7) 3GPP TS 25.331 V8.1.0 (Dec. 2007).

European Telecommunications Standards Institute, "Universal Mobile Telecommunications System (UMTS); Multiplexing and Channel Coding (FDD) (3GPP TS 25.212 Version 7.3.0 Release 7)", ETSI TS 125.212 V7.3.0, (Dec. 2006).

International Patent Application No. PCT/US2008/001457: International Search Report dated Aug. 18, 2008, 6 pages.

International Patent Application No. PCT/US2008/001457: Notification of Transmittal of International Preliminary Report on Patentability dated May 28, 2009, 6 pages.

International Patent Application No. PCT/US2008/001457: Written Opinion dated Aug. 18, 2008, 7 pages.

* cited by examiner

| Absolute Grant Value | Index |
|---|---|
| To be determined (TBD) | 63 |
| TBD | 62 |
| . | . |
| . | . |
| . | . |
| TBD | 32 |
| $(168/15)^2 \times 6$ | 31 |
| $(150/15)^2 \times 6$ | 30 |
| $(168/15)^2 \times 4$ | 29 |
| $(150/15)^2 \times 4$ | 28 |
| $(134/15)^2 \times 4$ | 27 |
| $(119/15)^2 \times 4$ | 26 |
| $(150/15)^2 \times 2$ | 25 |
| $(95/15)^2 \times 4$ | 24 |
| $(168/15)^2$ | 23 |
| $(150/15)^2$ | 22 |
| $(134/15)^2$ | 21 |
| $(119/15)^2$ | 20 |
| $(106/15)^2$ | 19 |
| $(95/15)^2$ | 18 |
| $(84/15)^2$ | 17 |
| $(75/15)^2$ | 16 |
| $(67/15)^2$ | 15 |
| $(60/15)^2$ | 14 |
| $(53/15)^2$ | 13 |
| $(47/15)^2$ | 12 |
| $(42/15)^2$ | 11 |
| $(38/15)^2$ | 10 |
| $(34/15)^2$ | 9 |
| $(30/15)^2$ | 8 |
| $(27/15)^2$ | 7 |
| $(24/15)^2$ | 6 |
| $(19/15)^2$ | 5 |
| $(15/15)^2$ | 4 |
| $(11/15)^2$ | 3 |
| $(7/15)^2$ | 2 |
| ZER_GRANT | 1 |
| INACTIVE | 0 |

Fig. 1

METHOD AND APPARATUS FOR MAPPING OF ABSOLUTE POWER GRANT VALUES IN WIRELESS COMMUNICATIONS

CROSS REFERENCE TO RELATED APPLICATION

This application claims the benefit of U.S. provisional application No. 60/887,856 filed Feb. 2, 2007, which is incorporated by reference as if fully set forth.

FIELD OF INVENTION

The present disclosure is related to wireless communications.

BACKGROUND

In wireless communications an allowable set of carrier amplitudes, power levels, or ratios of power levels may be assigned, or "granted" to a transmitter. These values may be dynamic—the grant may change with time as communication conditions change.

High-Speed Packet Access (HSPA) is a collection of mobile telephony protocols that extend and improve the performance of existing mobile telephony protocols. Evolution of HSPA to support higher system throughput and performance has lead to the introduction of 16QAM modulation on the uplink. One of the items required to support Higher Order Modulation (HOM) is an enhanced pilot.

Several options have been disclosed to provide the enhanced pilot including boosting the power of the Dedicated Physical Control Channel (DPCCH), boosting the power of the Enhanced Dedicated Physical Control Channel (E-DPCCH) and introduction of a second DPCCH. In the case of boosting the power of the DPCCH, scheduling issues occur when the Enhanced Absolute Grant Channel (E-AGCH) needs to jump abruptly and the operating point is near the boundary of the power grant for BPSK and 16QAM modulation. If the power of the E-DPCCH is boosted or a second DPCCH is added, the range of the power ratio may need to be extended. An increase in the power ratio will require either the E-AGCH to have more bits to cover the higher range, or the step sizes must be increased in the E-AGCH absolute grant value.

Current solutions have system drawbacks and require careful consideration of side effects of implementation. Promising options appear to be to boost E-DPCCH power or add a second DPCCH since this will require changing the E-AGCH absolute grant value mapping table and should have minimal impact on the system.

An improved E-AGCH absolute grant value mapping table currently existing has some problems regarding how the table should be updated. One solution would be to add additional indices to support higher power ratio range required for 16QAM. This change requires adding bits to the E-AGCH to cover the additional index values. The additional bits require a format change as well as coding changes. Thus, adding bits has significant effect on the overall system configuration.

One solution is to keep the E-AGCH format as is, including the number of bits, the coding and the format. It is also desirable to retain the current structure of the mapping table.

SUMMARY

The present disclosure is related to wireless communications where multiple power grant tables are used for different categories of users. Multiple power grant tables are stored in a wireless transmit/receive unit (WTRU). The WTRU receives a signal designating which table is to be used to grant power levels during a communication.

BRIEF DESCRIPTION OF THE DRAWINGS

FIG. 1 shows an example of an extended grant table.

DETAILED DESCRIPTION

Figure 2:
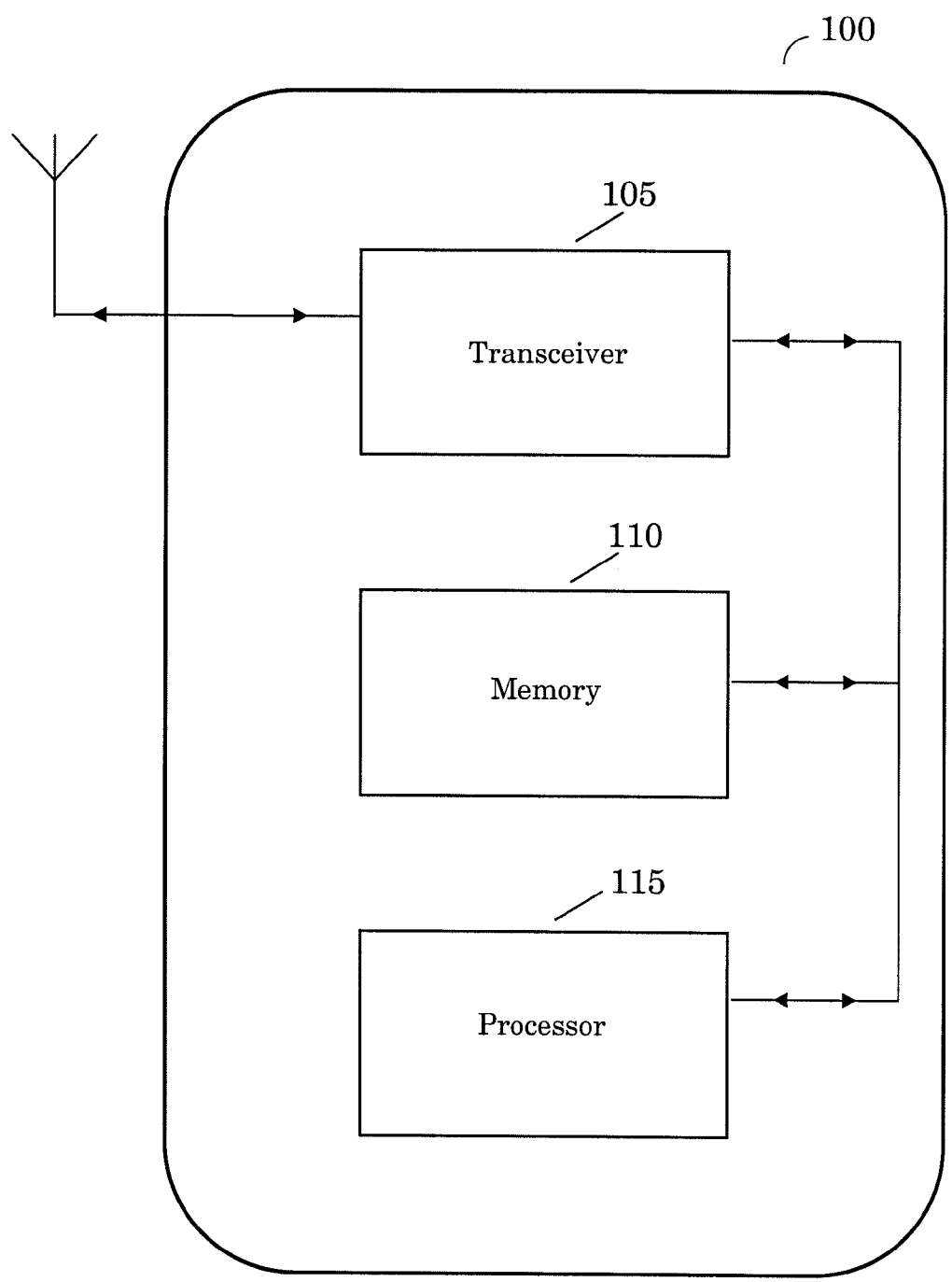
FIG. 2 shows an example of a communication device using multiple grant tables.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Although the present disclosure is described in the context of HSPA, it should not be construed as being limited to this context, which is used as an example.

A plurality of power grant tables are stored in the WTRU. In a first embodiment an index offset value and extended power grant table are disclosed. The plurality of power grant tables is derived from the extended table. As an example, one table of the plurality may contain power values which can be used for BPSK modulation while another contains power values which can be used for 16QAM modulation. The offset value is used as a pointer for the starting index and is established as part of initial call setup between two transceivers. An example of two such transceivers is a WTRU and a Node B initiating a call setup by Layer 3 signaling. Once the offset value is known to the WTRU, the portion of the extended grant table that will be used is known to the WTRU. This method provides flexibility since the extended table could be any size and only the applicable portion of the table is used.

Referring to FIG. 1, by way of example, an absolute grant value table, formerly with 32 indices, is extended to 64 indices by the addition of 32 new entries. An existing table is shown as feature 15 in FIG. 1, containing indices 0 through 31 and corresponding power ratio values in the column headed "Absolute Grant Value." The power ratio values are shown as squares of ratios of E-DPDCH amplitude to DPCCH amplitude. (E-DPDCH is Enhanced Dedicated Physical Data Channel and DPCCH is Dedicated Physical Control Channel.) The notation x4, x6 etc. in entries for index 24-31 indicates the number of E-DPDCH channels for each of these entries. Index 24 is associated with four E-DPDCH channels, index 25 with two, etc.

The table designated as feature 15 is defined in the Third Generation Partnership Project (3GPP) specification 25.212, version 7.5.0, section 4.10.1A.1. The 32 newly defined entries, defining a second table, are indicated as feature 10, with indices 32 through 63.

The two tables of FIG. 1 can accommodate both 16QAM modulation power ratios and BPSK modulation power ratios. For BPSK modulation, the index offset value is zero. This indicates that the table containing index values from 0-31 shall be used for BPSK. For 16QAM modulation, the index offset value is 32. This indicates that the table for 16QAM contains the entries having index values from 32-63. If the modulation scheme is on the borderline between BPSK and 16QAM, an index offset value of 16 may be used. This would indicate the use of the upper range of BPSK (index 16-31) and the lower range of 16QAM (index 32-47), resulting in a range of values from index number 16 to 47. To reduce the number of bits used to indicate the index offset value, a large table, for example a table with the number of indices much greater than 64, may be split into segments corresponding to the offset value. If, for example, only BPSK and 16QAM are used, then only 1-bit is required to indicate the offset value to determine whether the upper half 10 or lower half 15 of Table 1 is used.

The index offset value may be used to specify a custom power grant table depending on the number of bits that are available for use in the initial setup. This method provides flexibility with minimal changes in initial setup.

The offset value in the table may be transmitted to the WTRU in multiple ways. A first alternative is direct transmission of value during setup. Direct transmission of the offset value may be set up to accommodate any desired offset value.

A second alternative is to make the offset dependent on the slot offset of the AGCH relative to a top sub-frame boundary. For a currently configured AGCH, this allows for three possible values, namely 0, 1 or 2.

A third alternative is to make the offset a function of the Hybrid Radio Network Temporary Identifier (H-RNTI). The H-RNTI offset value could be pre-assigned for different offset values.

A fourth alternative is to make the offset dependent on the AGCH code or channel number that is being used for the AGCH. The AGCH coding or channel number could be set up for different offset values. Only one code currently exits for the AGCH. Other convolutional codes with same rate and puncturing could be used to signify different offsets. This may require that the WTRU perform several decoding cycles of AGCH data until the right code is selected.

As a fifth alternative, the offset could be signaled by the Radio Access Network (RAN) through Radio Resource Control (RRC) signaling. The value of the offset, and thereby the grant table being used, can either be static (i.e. same offset throughout the duration of the connection), semi-static (i.e. reconfigurable through L3 or L2 signaling) or dynamic (i.e. dynamically signaled to the Node B for every new transport block).

A second embodiment uses a separate power grant table for different modulation types, such as BPSK and 16QAM modulation. In this case, no setup is required since the modulation type determines the tables to use. The applicable table is designated based on the modulation type. By way of example, for BPSK modulation, a current absolute grant value mapping may be used, while for 16QAM modulation, a new grant table could be devised and either preconfigured in the WTRU or signaled to the WTRU. A current table which could be used for BPSK is defined in the Third Generation Partnership Project (3GPP) specification 25.212, version 7.5.0, section 4.10.1A.1. This method has no impact on current systems other than adding a new table for 16QAM modulation.

A third embodiment uses an existing power grant table, but with one or more larger intervals for the power ratio values so that the power values cover both BPSK and 16QAM modulation or other modulation types. This may be done by updating existing grant tables with new values. In particular, two power grant tables used in the WTRU may be tables 16B and 16B.12 in Third Generation Partnership Project (3GPP) specification 25.212, version 7.5.0, section 4.10.1A.1. The 3GPP specification 25.331, version 7.5.0, section 10.3.6.86a may also be used to define the tables. Grant tables, intervals, or both may be pre-configured in a WTRU. Alternatively, tables, intervals or both may be signaled to the WTRU through RRC signaling upon establishment of the radio communication. In the latter case, either a table or an interval between power values can also be dynamically reconfigurable throughout the life of a connection through RRC signaling. The updated grant table may be signaled by the RAN to the WTRU in one of the following ways: signaling the entire table; signaling the first and last power grant values; or signaling an interval between power values.

Table 1 summarizes embodiments and alternatives described above.

TABLE 1

| ORIGIN OF GRANT TABLES | DESIGNATION OF GRANT TABLE | ALTERNATIVES |
|---|---|---|
| Tables are preconfigured in WTRU | Offset value | Offset indicates beginning of table portion |
| Increasing at least one interval for power values in a predefined table to derive a second table | | Offset indicates segment of table to be used |
| Table, interval, or both are received through RRC signaling, allowing for dynamically reconfiguring of table or interval | | Offset value defined and received by: Direct transmission Slot offset RNTI E-AGCH code E-AGCH channel No. RAN by RRC signaling Offset is: unchanged during connection reconfigurable dynamically signaled |
| | Based on modulation type | Modulation type may be QAM type, such as BPSK, QPSK, 16QAM, etc. |

FIG. 2 shows a wireless transmit receive unit (WTRU) 100 configured to operate according to the method disclosed above. WTRU 100 contains a transceiver 105 operating as a transmitter and a receiver, a memory 110, and a processor 115. Memory 110 stores a plurality of power grant tables. Transceiver 105 is configured for receiving a signal designating which table is to be used to grant power levels during a communication. The signal may contain an offset or an interval for defining and designating grant tables, as described above. Transceiver 105 may receive grant tables which may be stored in memory 110. Processor 115 processes the information in the signal, designates the grant table to be used, and controls transmitted power based on the designated table.

Although the features and elements of the present disclosure are described in particular combinations, each feature or element can be used alone without the other features and elements or in various combinations with or without other features and elements. The methods or flow charts provided in the present disclosure may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of providing a power grant to a wireless transmit/receive unit (WTRU), comprising:
   storing a plurality of power grant tables; and
   receiving a signal designating which table is to be used to grant power levels during a communication via signaling in a Radio Access Network (RAN) through Radio Resource Control (RRC) signaling.

2. The method of claim 1, wherein each power grant table is a portion of a larger table, the signal designating the portion to be used to grant power levels.

3. The method of claim 1, wherein said designating is based on a modulation type being used.

4. The method of claim 2 comprising:
   receiving an offset value in the signal; and
   using the offset value to designate the portion to be used.

5. The method of claim 4, comprising:
   assigning an index to each power value in the larger table; and
   designating the portion to be used by using the offset value as a pointer to an index indicating a beginning of the portion.

6. The method of claim 3, wherein the modulation type is a quadrature amplitude modulation (QAM) type.

7. The method of claim 6, wherein the QAM type is one of: binary phase-shift coding (BPSK) and 16-symbol QAM (16QAM).

8. The method of claim 1 comprising designating which table is to be used as part of an initial setup of communication with the WTRU.

9. The method of claim 4 comprising using the offset value to specify a power grant table depending on a number of bits that are available for use in the initial setup.

10. The method of claim 4, comprising receiving the offset value as a direct transmission.

11. The method of claim 4 comprising receiving the offset value as a relative slot offset in a channel.

12. The method of claim 4 comprising receiving the offset value as a function of a Hybrid Radio Network Temporary Identifier (H-RNTI).

13. The method of claim 4 comprising receiving the offset value as a code used for an enhanced absolute grant channel (E-AGCH).

14. The method of claim 4 comprising receiving the offset value as a channel number used for an enhanced absolute grant channel (E-AGCH).

15. The method of claim 1, wherein the designated table is unchanged throughout the duration of a communications connection.

16. The method of claim 1, wherein the table designation is reconfigurable during a communications connection.

17. The method of claim 16, comprising reconfiguring the designation using Layer 2 or Layer 3 signaling.

18. The method of claim 1, wherein the designated table is dynamically signaled for each transport block.

19. The method of claim 1 wherein the plurality of tables includes tables 16B and 16B.12 in Third Generation Partnership Project (3GPP) specification 25.212, version 7.5.0, section 4.10.1A.1.

20. The method of claim 1 wherein the tables are defined using Third Generation Partnership Project (3GPP) specification 25.331, version 7.5.0, section 10.3.6.86a.

21. The method of claim 2, wherein the larger table is derived by adding power values to table 16B in the Third Generation Partnership Project (3GPP) specification 25.212, version 7.5.0, section 4.10.1A.1.

22. The method of claim 21, wherein the added power values are used for 16QAM modulation.

23. The method of claim 1, comprising storing first and second power grant tables, the second table being derived from the first table.

24. The method of claim 23, wherein the first and second tables are preconfigured in the WTRU.

25. The method of claim 23, wherein the second table is derived by increasing an interval between power levels in the first table.

26. The method of claim 23, wherein the first table is table 16B in the Third Generation Partnership Project (3GPP) specification 25.212, version 7.5.0, section 4.10.1A.1.

27. The method of claim 23, wherein the first table is table 16B.12 in the Third Generation Partnership Project (3GPP) specification 25.212, version 7.5.0, section 4.10.1A.1.

28. The method of claim 23 comprising signaling the first table through RRC signaling.

29. The method of claim 25, wherein the interval is pre-configured in the WTRU.

30. The method of claim 25, comprising signaling the interval through RRC signaling.

31. The method of claim 30, comprising dynamically reconfiguring the interval through RRC signaling.

32. The method of claim 23, comprising signaling the second table in its entirety to the WTRU.

33. The method of claim 15 comprising signaling the interval to the WTRU by signaling first and last power values for the second table.

34. A wireless transmit/receive unit (WTRU) comprising:
a memory configured to store a plurality of power grant tables;
a receiver configured for receiving a signal designating which table is to be used to grant power levels during a communication via signaling in a Radio Access Network (RAN) through Radio Resource Control (RRC) signaling;
a processor configured to processes the signal, designate the grant table to be used, and control transmitted power based on the designated table; and
a transmitter configured to transmit information using the granted power levels.

35. The WTRU of claim 34, wherein the processor is configured to designate a portion of a larger table as the grant table to be used.

36. The WTRU of claim 34, wherein the processor is configured to designate the grant table based on a modulation type.

37. The WTRU of claim 35, wherein the receiver is configured to receive an offset value used to designate the portion.

38. The WTRU of claim 37, wherein the memory is configured to store a table containing an index for each power value and the processor is configured to designate the portion to be used by using the offset value as a pointer to an index indicating a beginning of the portion.

39. The WTRU of claim 36, wherein the modulation type is a quadrature amplitude modulation (QAM) type.

40. The WTRU of claim 39, wherein the QAM type is one of: binary phase-shift coding (BPSK) and 16-symbol QAM (16QAM).

41. The WTRU of claim 34, wherein the processor is configured to designate which table is to be used as part of an initial setup of communication with the WTRU.

42. The WTRU of claim 37, wherein the processor is configured to use the offset value to specify a power grant table depending on a number of bits that are available for use in the initial setup.

43. The WTRU of claim 37, wherein the receiver is configured to receive the offset value as a direct transmission.

44. The WTRU of claim 37, wherein the receiver is configured to receive the offset value as a relative slot offset in a channel.

45. The WTRU of claim 37, wherein the receiver is configured to receive the offset value as a function of a Hybrid Radio Network Temporary Identifier (H-RNTI).

46. The WTRU of claim 37, wherein the receiver is configured to receive the offset value as a code used for an enhanced absolute grant channel (E-AGCH).

47. The WTRU of claim 37, wherein the receiver is configured to receive the offset value as a channel number used for an enhanced absolute grant channel (E-AGCH).

48. The WTRU of claim 34, wherein the transmitter is configured to use a single designated grant table throughout the duration of a communications connection.

49. The WTRU of claim 34, wherein the processor is configured to reconfigure the table designation during a communications connection.

50. The WTRU of claim 49, wherein the processor is configured to reconfigure the designation using Layer 2 or Layer 3 signaling.

51. The WTRU of claim 34, wherein the receiver is configured to receive the designated table when signaled dynamically for each transport block.

52. The WTRU of claim 34, wherein the memory is configured to store tables 16B and 16B.12 in Third Generation Partnership Project (3GPP) specification 25.212, version 7.5.0, section 4.10.1A.1.

53. The WTRU of claim 34, wherein the memory is configured to store tables defined using Third Generation Partnership Project (3GPP) specification 25.331, version 7.5.0, section 10.3.6.86a.

54. The WTRU of claim 35, wherein the memory is configured to store the larger table when derived by adding power values to table 16B in the Third Generation Partnership Project (3GPP) specification 25.212, version 7.5.0, section 4.10.1A.1.

55. The WTRU of claim 54, wherein the transmitter is configured for transmitting using 16QAM modulation and the added power values.

56. The WTRU of claim 34, wherein the memory is configured to store first and second power grant tables, the second table being derived from the first table.

57. The WTRU of claim 56, wherein the memory is configured to store preconfigured first and second power grant tables.

58. The WTRU of claim 56, wherein the memory is configured to store the second table when derived by increasing an interval between power levels in the first table.

59. The WTRU of claim 56, wherein the memory is configured to store table 16B in the Third Generation Partnership Project (3GPP) specification 25.212, version 7.5.0, section 4.10.1A.1. as the first table.

60. The WTRU of claim 56, wherein the memory is configured to store table 16B.12 in the Third Generation Partnership Project (3GPP) specification 25.212, version 7.5.0, section 4.10.1A.1. as the first table.

61. The WTRU of claim 56, wherein the receiver is configured to receive the first table when signaled through RRC signaling.

62. The WTRU of claim 58, wherein the memory is configured to store the interval as a preconfigured interval.

63. The WTRU of claim 58, wherein the receiver is configured to receive the interval when signaled through RRC signaling.

64. The WTRU of claim 63, wherein the processor is configured for dynamically reconfiguring the interval.

65. The WTRU of claim 56, wherein the receiver is configured to receive the second table in its entirety.

66. The WTRU of claim 58, wherein the receiver is configured to receive first and last power values for the second table and the processor is configured to determine the interval from said first and last values.

* * * * *